United States Patent
Ohtsuki et al.

(10) Patent No.: US 7,267,486 B2
(45) Date of Patent: Sep. 11, 2007

(54) PROTECTIVE CAP FOR WHEEL SUPPORT BEARING ASSEMBLY

(75) Inventors: Hisashi Ohtsuki, Iwata (JP); Hideo Shinagawa, Iwata (JP); Takayuki Norimatsu, Iwata (JP)

(73) Assignee: NTN Corporation, Osaka (JP)

( * ) Notice: Subject to any disclaimer, the term of this patent is extended or adjusted under 35 U.S.C. 154(b) by 503 days.

(21) Appl. No.: 10/721,359

(22) Filed: Nov. 26, 2003

(65) Prior Publication Data

US 2004/0105603 A1    Jun. 3, 2004

(30) Foreign Application Priority Data

Nov. 27, 2002 (JP) .............................. 2002-344608

(51) Int. Cl.
  *F16C 33/78* (2006.01)
(52) U.S. Cl. ...................... 384/448; 384/477; 384/484; 384/489
(58) Field of Classification Search ................ 384/448, 384/477, 489, 484
See application file for complete search history.

(56) References Cited

U.S. PATENT DOCUMENTS

| | | | | |
|---|---|---|---|---|
| 3,148,798 | A | * | 9/1964 | Brown .......................... 220/801 |
| 5,873,658 | A | * | 2/1999 | Message et al. ............. 384/448 |
| 5,969,518 | A | * | 10/1999 | Merklein et al. ............ 324/173 |
| 6,286,699 | B1 | * | 9/2001 | Sudo ........................... 215/364 |
| 6,637,754 | B1 | | 10/2003 | Ohtsuki et al. |
| 6,688,770 | B1 | | 2/2004 | Schottdorf et al. |
| 6,692,153 | B2 | * | 2/2004 | Ohtsuki et al. ............. 384/448 |
| 6,877,903 | B2 | * | 4/2005 | Aiba et al. .................. 384/448 |
| 2002/0126926 | A1 | | 9/2002 | Ohtsuki et al. |
| 2002/0140418 | A1 | * | 10/2002 | Ichiman ...................... 324/174 |
| 2004/0086212 | A1 | | 5/2004 | Ohtsuki et al. |
| 2005/0259902 | A1 | * | 11/2005 | Ohtsuki et al. ............. 384/448 |

FOREIGN PATENT DOCUMENTS

| | | | |
|---|---|---|---|
| JP | 2001-50288 | * | 2/2001 |
| JP | 2002-213465 | * | 7/2002 |
| WO | WO 01/25799 A1 | | 4/2001 |

OTHER PUBLICATIONS

Sugiyama Katsumi, Patent Abstracts of Japan, "Bearing for Wheel", Publication No. 2001/215132, Publication Date: Aug. 10, 2001.
Otsuki Hisashi et al., Patent Abstracts of Japan, "Bearing For Wheel", Publication No. 2001-215132, Publication Date: Aug. 10, 2001.

* cited by examiner

*Primary Examiner*—William C. Joyce

(57) ABSTRACT

To avoid an adherence of metallic particles from a knuckle to a magnetic encoder during coupling of a wheel support bearing assembly to the knuckle and/or transportation of the wheel support bearing assembly, a protective cap (18) is provided. The wheel support bearing assembly with which the protective cap (18) can be used is of a type including a magnetic encoder (10) provided in a sealing unit (5). This protective cap (18) includes an annular cover-up portion (18a) for enclosing an annular surface of the magnetic encoder (10) that is exposed bare to the outside, and an engagement wall (18b). The engagement wall (18b) is integral with the annular cover-up portion (18a) and of a cylindrical shape capable of being removably engaged in the wheel support bearing assembly.

7 Claims, 4 Drawing Sheets

PROTECTIVE CAP FOR WHEEL SUPPORT
BEARING ASSEMBLY

BACKGROUND OF THE INVENTION

1. Field of the Invention

The present invention generally relates to a wheel support bearing assembly having a built-in magnetic encoder and, more particularly, to a protective cap employed in the wheel support bearing assembly for protecting the magnetic encoder.

2. Description of the Prior Art

Automotive vehicles equipped with an anti-skid braking system (ABS) generally includes a rotation detecting device for detecting the number of revolutions of at least one vehicle wheel so that the anti-skid braking system can be controlled to minimize the hazard of the automotive vehicle being skidded. The rotation detecting device is generally incorporated in a wheel support bearing assembly. The wheel support bearing assembly having the rotation detecting device incorporated therein is suggested in, for example, the Japanese Laid-open Patent Publication No. 2001-215132 and includes an inner member, an outer member positioned radially outwardly of the inner race with an annular working space defined between it and the inner race, circumferentially extending rows of rolling elements rollingly accommodated within the annular working space, a sealing member for sealing each of opposite open ends of the annular working space, and a magnetic encoder integrated with one of the sealing members and having a plurality of alternating magnetic poles deployed in a direction circumferentially of any one of the inner and outer races. The rotation detecting device referred to above is constructed of the magnetic encoder in combination with a sensor positioned in face-to-face relation with the magnetic encoder for detecting change in magnetic polarity as a result of rotation of the vehicle wheel.

However, it has been found that since in the wheel support bearing assembly of the structure discussed above, the magnetic encoder built therein is exposed or unprotected when the wheel support bearing assembly is coupled with a knuckle connected with a vehicle body structure, metallic particles such as fine metallic shavings remained on, for example, the knuckle are deposited on and/or stick to the magnetic encoder, lowering the performance of the magnetic encoder. As is well known to those skilled in the art, the knuckle is in most cases wetted with oil and, therefore, fine metallic shavings removed from the knuckle as a result of grinding are deposited on the knuckle in contact with the oil. When the wheel support bearing assembly is coupled with the contaminated knuckle, the magnetic encoder incorporated in the wheel support bearing assembly is susceptible to deposition of the metallic particles. Accordingly, the workshop requires a smearing process to remove the magnetic particles deposited on the magnetic encoder.

Not only when the wheel support bearing assembly is being coupled with the knuckle, but also when, for example, the wheel support bearing assembly is being transported, there is a high possibility that the metallic particles may deposit on the magnetic encoder.

SUMMARY OF THE INVENTION

In view of the foregoing, the present invention has for its primary object to provide a protective cap for a wheel support bearing assembly, which is effective to avoid an undesirable accretion of metallic particles to a magnetic encoder during mounting of the wheel support bearing assembly to a knuckle and also during transportation of the wheel support bearing assembly.

The protective cap herein disclosed is removably used on a wheel support bearing assembly. This wheel support bearing assembly includes an outer member having an inner peripheral surface formed with raceways, an inner member having an outer peripheral surface formed with raceways in alignment with the raceways in the outer member, rows of rolling elements operatively interposed between the raceways in the outer member and the raceways in the inner member, sealing units for sealing respective open ends of an annular working space delimited between the inner and outer members, and a magnetic encoder provided in one of the sealing units and having an annular surface exposed bare to an outside of the annular working space, that is, to a radial face of the wheel support bearing assembly. The magnetic encoder has a plurality of alternating magnetic poles arranged in a direction circumferentially thereof.

In order to accomplish the foregoing object of the present invention, the protective cap includes an annular cover-up portion for enclosing the annular surface of the magnetic encoder that is exposed bare to the outside of the annular working space, and an engagement wall integral with the annular cover-up portion and capable of being removably engaged in the wheel support bearing assembly. This protective cap is removably mounted on the wheel support bearing assembly with the cover-up portion enclosing the annular surface of the magnetic encoder.

According to the present invention, when the protective cap is mounted on the wheel support bearing assembly through the engagement wall, the exposed annular surface of the magnetic encoder can be covered by the annular cover-up portion of the protective cap. Accordingly, when the wheel support bearing assembly is coupled with the knuckle or transported, an undesirable adherence of metallic particles to the magnetic encoder can advantageously be avoided.

In a preferred embodiment, the engagement wall may be removably engaged with one end of an axial bore of the inner member. Where the inner member is constructed of a hub wheel and an inner race mounted on an outer peripheral surface of the hub wheel, the engagement wall may be removably engageable with one end of a bore defined in the inner race.

According to this feature that the engagement wall is engageable with one end of the axial bore of the inner member, the protective cap can be kept mounted on the wheel support bearing assembly by the time the latter is coupled with the knuckle and, accordingly, an undesirable adherence of metallic particles to the magnetic encoder can be avoided. Also, during the subsequent coupling of the hub wheel into the axial bore of the inner member, the engagement wall of the protective cap will interfere with the hub wheel unless the protective cap is removed from the wheel support bearing assembly and, hence, failure of the attendant worker to remove the protective cap can also be prevented.

The engagement wall of the protective cap may be of a cylindrical shape or may be comprised of a plurality of circumferentially disposed tubs or projections. Where the engagement wall is of a cylindrical shape, a firm mounting of the protective cap onto the wheel support bearing assembly can advantageously be achieved.

In another preferred embodiment of the present invention, the protective cap may further include a center cover-up portion for covering a center portion of an end face of the wheel support bearing assembly. By way of example, where the protective cap is of a generally disc shape, an outer peripheral portion of the disc will define the annular cover-up portion whereas a center portion of the disc defines the center cover-up portion.

The use of the center cover-up portion advantageously serves to avoid an undesirable ingress of dusts and dirt into the axial bore of the wheel support bearing assembly.

In a further preferred embodiment of the present invention, the protective cap may be of a ring shape, in which case the engagement wall is so formed as to be removably inserted in a gap delimited between an outer periphery of the encoder and the sealing unit. By way of example, the engagement wall may engage an outer peripheral edge of the magnetic encoder.

If the protective cap is of a ring shape and the engagement wall is removably inserted in a gap delimited between an outer periphery of the encoder and the sealing unit, the protective cap can be removed from the wheel support bearing assembly after the latter has been coupled with the knuckle and, hence, the metallic particles will hardly adhere to the magnetic encoder.

In a still further preferred embodiment of the present invention, where the inner member of the wheel support bearing assembly is made up of an inner race and a hub wheel engageable with an inner peripheral surface of the inner race, the engagement wall may be removably engageable with one end of an inner peripheral surface of the hub wheel.

According to this feature, for example, after the wheel support bearing assembly has been coupled with the knuckle and, also, with the hub wheel, the protective cap can be mounted on the wheel support bearing assembly. Accordingly, an undesirable adherence of metallic particles which would occur during a transportation of an assembly including the wheel support bearing assembly and the knuckle can advantageously be avoided.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
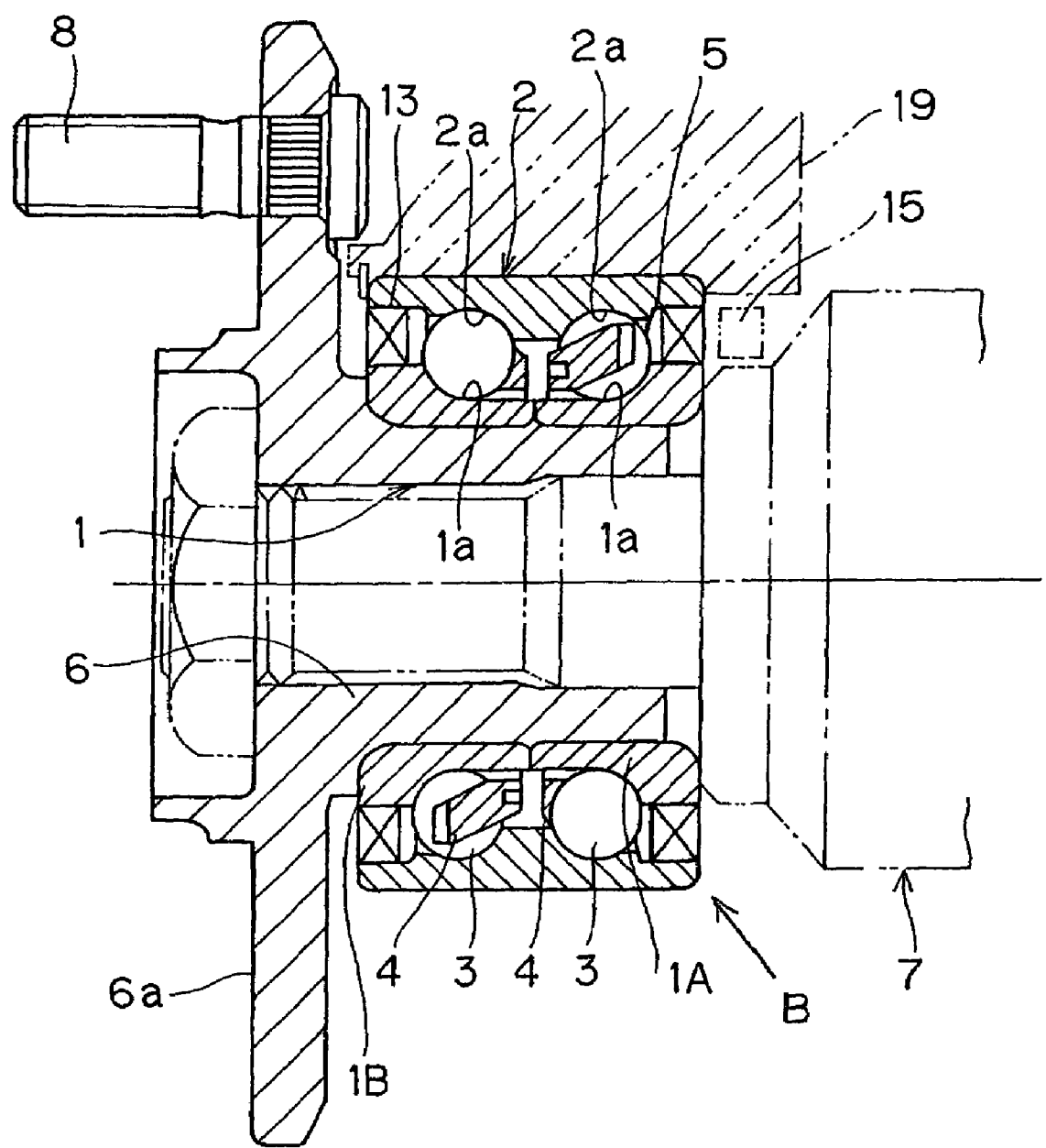
FIG. 1 is a longitudinal sectional view of a wheel support bearing assembly utilizing a protective cap according to a first preferred embodiment of the present invention.

A first preferred embodiment of the present invention will now be described in detail with reference to FIGS. 1 to 4. FIG. 1 illustrates, in a longitudinal sectional view, a wheel support bearing assembly B in which a protective cap according to the first preferred embodiment of the present invention is mounted. The wheel support bearing assembly B is shown as used for rotatably supporting a drive wheel of an automotive vehicle and includes an inner member 1 serving as a rotatable member, an outer member 2 serving as a stationary member relative to the inner member 1 and positioned radially outwardly of the inner member 1 in coaxial relation thereto with an annular working space defined between it and the inner member 1, a plurality of, for example, two, circumferential rows of rolling elements 3 accommodated within the annular working space, and inboard and outboard sealing units 5 and 13 for sealing respective open ends of the annular working space that are opposite to each other. As will be detailed later, one of the sealing units, that is, the inboard sealing unit 5 is equipped with a magnetic encoder 10 as best shown in FIG. 3.

The inner member 1 has its outer peripheral surface formed with axially spaced raceway grooves 1a and, similarly, the outer member 2 has its inner peripheral surface formed with axially spaced raceway grooves 2a in alignment with the respective raceway grooves 1a in the inner member 1. The rows of the rolling elements 3 accommodated within the annular working space between the inner and outer members 1 and 2 are in part received within the raceway grooves 1a in the inner member 1 and in part within the raceway grooves 2a in the outer member 2. The inner and outer members 1 and 2 are members positioned on inner and outer sides, respectively, which are rotatable relative to each other through the rows of the rolling elements 3. These inner and outer members 1 and 2 may be either bearing inner and outer races, respectively, or assembly parts constituted by associated elements combined with the bearing inner and outer races. Also, the inner member 1 may be a shaft. The rolling elements 3 are in the form of either a ball or a roller, but a ball is used for each of the rolling element 3 in the illustrated embodiment. The rolling elements 3 of each row are operatively retained by a retainer or cage 4.

The wheel support bearing assembly B so far shown is a double row rolling bearing assembly and, more particularly, a double row angular contact ball bearing assembly and has a bearing inner race constructed of inner race segments 1A and 1B that have respective raceway grooves 1a and 1a defined therein. The inner race segments 1A and 1B are fixedly mounted on a cylindrical shank portion of a hub wheel 6 and cooperate with the hub wheel 6 to define the inner member 1.

The hub wheel 6 is coupled with one end of a constant velocity universal joint 7, for example, an outer race of the constant velocity universal joint 7 for rotation together therewith and has a radially outwardly extending flange 6a to which a vehicle wheel (not shown) is fitted by means of a plurality of anchor bolts 8. The opposite end of the constant velocity universal joint 7, that is, an inner race of the constant velocity universal joint 7 is coupled with a drive axle (not shown).

In the illustrated embodiment, the outer member 2 is represented by a bearing outer race and is fixedly inserted in a mounting bore defined in the knuckle 19 of a wheel suspension system as shown in FIG. 1.

Figure 2:
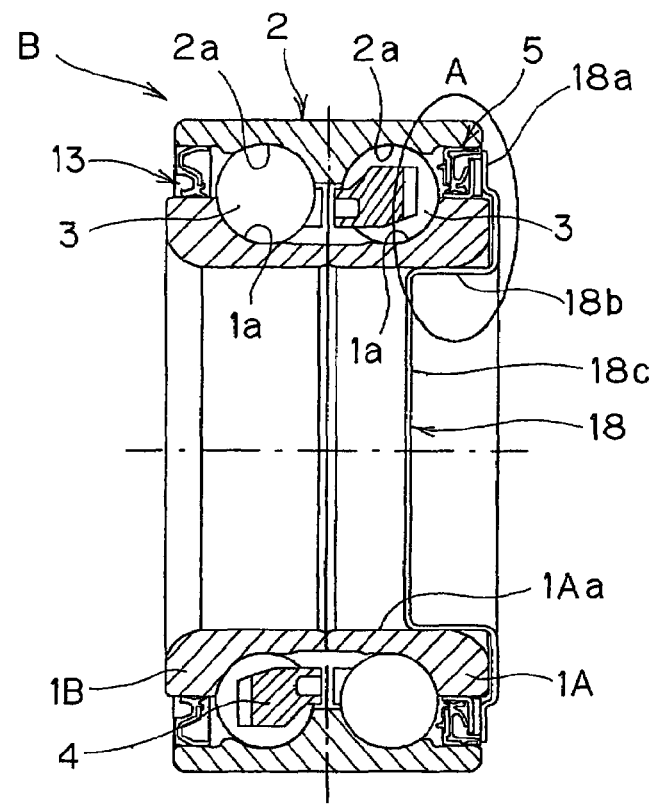
FIG. 2 is a longitudinal sectional view of the wheel support bearing assembly, showing the protective cap mounted thereon.
Figure 3:
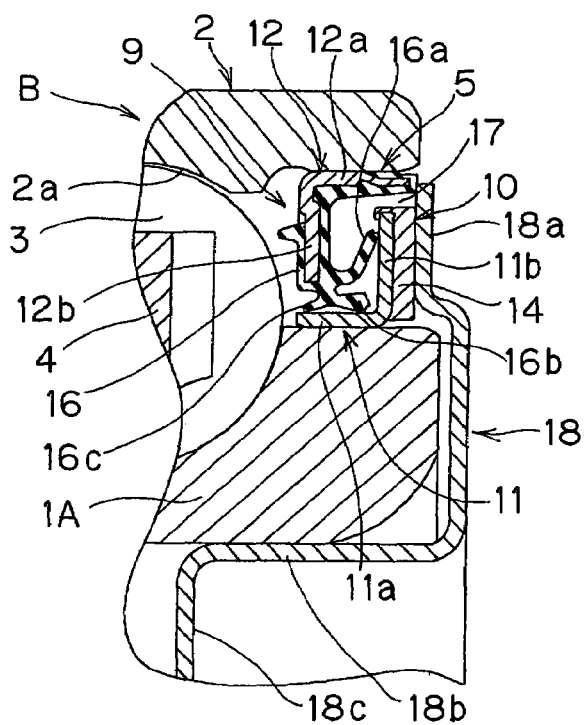
FIG. 3 is a fragmentary longitudinal sectional view, showing on an enlarged scale a portion of the wheel support bearing assembly which is encompassed by the circle A in FIG. 2.

FIG. 2 illustrates the wheel support bearing assembly B before it is mounted on the shank portion of the hub wheel 6 and also before it is inserted in the mounting hole in the knuckle 19. FIG. 3 illustrates, on an enlarged scale, a portion A of the wheel support bearing assembly B where the inboard sealing unit 5 is disposed. As best shown in FIG. 3, the inboard sealing unit 5 is made up of an magnetic encoder 10 and a stationary sealing member 9. The magnetic encoder 10 serves as a slinger and is fixedly mounted on the inner member 1 which is a member rotatable relative to the outer member 2.

The details of the inboard sealing unit 5 will now be described. As best shown in FIG. 3, the inboard sealing unit 5 includes first and second annular sealing plates 11 and 12 made of a metallic material and press-fitted respectively on the inner and outer members 1 and 2. More specifically, each of the first and second annular sealing plates 11 and 12 is of a generally L-sectioned configuration including a cylindrical wall 11a or 12a and a radial wall 11b or 12b lying perpendicular to the respective cylindrical wall 11a or 12a. The first annular sealing plate 11 is fixed to the inner member 1 with the cylindrical wall 11a press-fitted onto the inner member 1 as a rotatable member and serves as a slinger. This first annular sealing plate 11 defines a core metal for a magnetic encoder 10.

Figure 4:
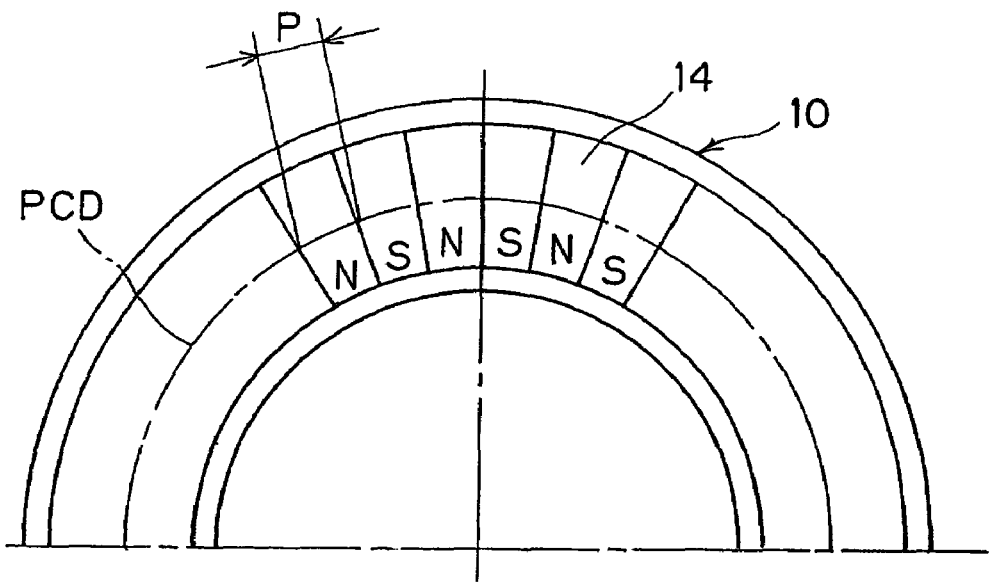
FIG. 4 is a fragmentary front elevational view of a magnetic encoder incorporated in the wheel support bearing assembly, showing the manner in which magnetic poles are arranged.

The magnetic encoder 10 is of a structure including an annular multi-pole magnet 14 fixed to one of opposite annular surfaces of the radial wall 11b, which faces to the inboard side of the wheel support bearing assembly B or confronts towards the constant velocity universal joint 7 (FIG. 1). As best shown in FIG. 4, the annular multi-pole magnet 14 has a disc-shaped structure in which a plurality of alternating opposite magnetic poles N and S are arranged in a direction circumferentially thereof, and has an outer peripheral edge overhanging an outer peripheral edge of the radial wall 11b of the first annular sealing plate 11. This multi-pole magnet 14 is in the form of a so-called rubber magnet of which opposite magnetic poles N and S are arranged at intervals of a predetermined pitch p as measured along the pitch circle diameter PCD as shown in FIG. 4. This multi-pole magnet 14 may be either a plastic magnet or a magnet made of a sintered alloy.

The multi-pole magnet 14, as shown in FIG. 1, cooperates with a magnetic sensor 15 to define a rotation detecting device for detecting the number of revolutions of the vehicle wheel. This magnetic sensor 15 is carried by the vehicle body structure and is positioned in face-to-face relation with the multi-pole magnet 14 for detecting, as a function of the number of revolutions of the vehicle wheel, cyclic passage of the opposite magnetic poles N and S of the multi-pole magnet 14 during rotation of the inner member 1 relative to the outer member 2.

The second annular sealing plate 12 is a member forming the stationary sealing member 9 and is integrated with an elastic side lip 16a, held in sliding contact with the radial wall 11b of the first annular sealing plate 11, and a pair of elastic radial lips 16b and 16c held in sliding contact with the cylindrical wall 11a of the first annular sealing plate 11. These elastic lips 16a to 16c form respective parts of an elastic sealing element 16 which is bonded by vulcanization to the second annular sealing plate 12.

The first and second annular sealing plates 11 and 12 are so positioned relative to each other that a slight radial gap is formed between the cylindrical wall 12a of the second annular sealing plate 12 and the outer peripheral edge of the radial wall 11b of the first annular sealing plate 11, which radial gap defines a labyrinth seal 17.

A protective cap according to the illustrated embodiment is identified by 18. This protective cap 18 is, as best shown in FIG. 2, mounted on the wheel support bearing assembly B before such wheel support bearing assembly B is coupled with the knuckle 19 (FIG. 1), forming a part of the wheel suspension system and carried by the vehicle body structure, and also before the wheel support bearing assembly B is mounted on the hub wheel 6. This protective cap 18 is of one-piece structure including an outer peripheral annular cover-up portion 18a for covering the inboard open end of the annular working space between the inner and outer members 1 and 2 so as to enclose the magnetic encoder 10, a cylindrical engagement wall 18b lying generally perpendicular to and positioned generally radially inwardly of the cover-up portion 18a, and a center cover-up portion 18c lying perpendicular to and extending radially inwardly of the cylindrical engagement wall 18b.

The annular cover-up portion 18a is so radially sized as to cover both an annular inboard end of the inner race segment 1A and the inboard open end of the annular working space and has a radially inner edge continued to the cylindrical engagement wall 18b, and the center cover-up portion 18c is continued from the cylindrical wall 18b and extends radially inwardly from one end of the cylindrical engagement wall 18b opposite to the other end from which the annular cover-up portion 18a extends. In other words, the cylindrical engagement wall 18b has one end formed integrally with the annular cover-up portion 18a which lies generally perpendicular to the cylindrical engagement wall 18b and the opposite end formed integrally with the center cover-up portion 18c which lies perpendicular to the cylindrical engagement wall 18b.

The protective cover 18 represents a generally cup-shaped configuration. The protective cap 18 is mounted on the wheel support bearing assembly B by removably engaging the engagement wall 18b with the wheel support bearing assembly B. Thus, in the illustrated embodiment, in the condition in which the protective cover 18 is mounted on the wheel support bearing assembly B, the cylindrical engagement wall 18b is engaged with one end of a center bore 1Aa of the inner race segment 1A in the inner member 1 while the cover-up portion 18a covers the magnetic encoder 10 and the radial face of the inner race segment 1A and the center cover-up portion 18c covers a center portion of an end face of the wheel support bearing assembly B, as clearly shown in FIG. 2.

The protective cover 18 is preferably made of a synthetic resin such as polypropylene and polyethylene, but may be made of a non-magnetic metallic material or a paperboard embossed to represent the specific configuration.

The protective cap 18 is kept mounted on the wheel support bearing assembly B until the latter is installed in position coupled with the hub wheel 6 and the knuckle 19 (FIG. 1). Hence, during the mounting of the outer member 2 of the wheel support bearing assembly B on the knuckle 19, the multi-pole magnet 14 of the magnetic encoder 10 is enclosed by the annular cover-up portion 18a of the protective cap 18. Accordingly, it is possible to avoid an undesirable accretion of metallic particles, such as metallic shavings adhering to the knuckle 19, to the magnetic encoder 10 by the time the wheel support bearing assembly B is installed in position with the outer member 2 coupled with the knuckle 19. Thus, it will readily be seen that an undesirable reduction in performance of the magnetic encoder 10, which would otherwise occur when metallic particles deposit on the magnetic encoder 10, can advantageously be eliminated.

As a matter of course, this protective cap 18 is removed from the wheel support bearing assembly B when the hub wheel 6 is ready to be inserted into the coaxially aligned inner race segments 1A and 1B of the wheel support bearing assembly B. In the event that the attendant worker fails to remove the protective cap 18 by any reason, insertion of the shank portion of the hub wheel 6 into the coaxially aligned inner race segments 1A and 1B of the wheel support bearing assembly B can result in collision of the shank portion of the hub wheel 6 against the center cover-up portion 18c and the cylindrical engagement wall 18b and, accordingly, the attendant worker can realize that the protective cap 18 has not yet been removed.

Figure 5:
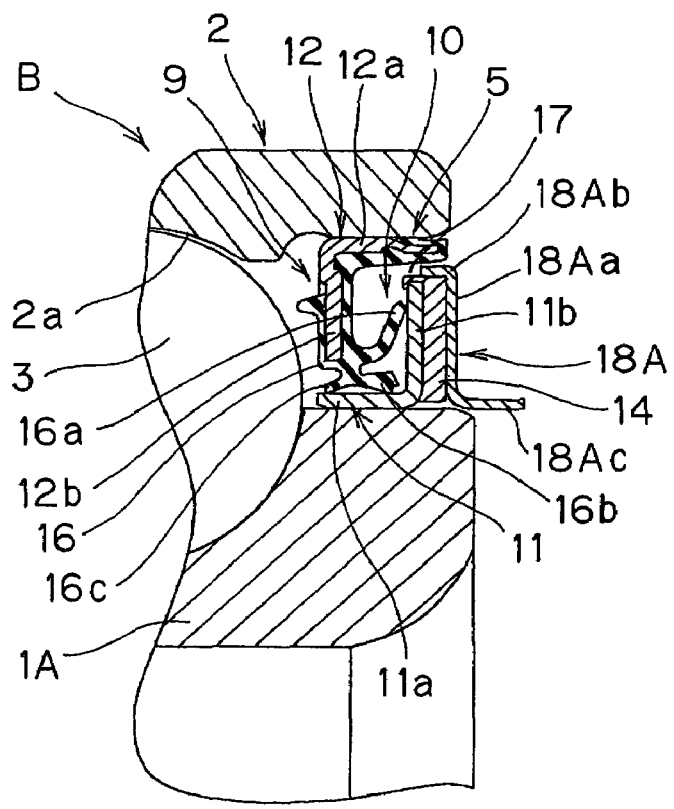
FIG. 5 is a fragmentary longitudinal sectional view, showing on an enlarged scale the manner in which the protective cap is mounted on the wheel support bearing assembly according to a second preferred embodiment of the present invention.

FIG. 5 illustrates the protective cap according to a second preferred embodiment of the present invention. The protective cap now identified by 18A is of a ring shape and of one-piece annular configuration including a radially extending annular cover-up portion 18Aa and a cylindrical engagement wall 18Ab of a large diameter extending perpendicular from an outer peripheral edge of the annular cover-up portion 18Aa so as to protrude axially inwardly of the wheel support bearing assembly B. The protective cap 18A also has a cylindrical knob 18Ac of a small diameter formed integrally with an inner peripheral edge of the cover-up portion 18Aa so as to extend axially outwardly of the wheel support bearing assembly B from that edge. The protective cap 18A as a whole represents a generally Z-shaped configuration in section. The cylindrical engagement wall 18Ab is adapted to be inserted into an annular gap delimited between an outer periphery of the magnetic encoder 10 and an outer periphery of the inboard sealing unit 5 and can engage the outer periphery of the magnetic encoder 10. Even this protective cap 18A is preferably made of a synthetic resin such as polypropylene and polyethylene, but may be made of a non-magnetic metallic material or a paperboard embossed to represent the specific configuration.

According to the embodiment shown in and described with reference to FIG. 5, the protective cap 18A can be removably mounted on the wheel support bearing assembly B by capping the cylindrical engagement wall 18Ab on the outer peripheral edge of the magnetic encoder 10 with the cylindrical knob 18Ac held by hand. By so doing, the multi-pole magnet 14 of the magnetic encoder 10 is enclosed by the annular cover-up portion. This protective cap 18A may be removed from the wheel support bearing assembly B after such wheel support bearing assembly B has been installed in position coupled with both the knuckle 19 and the hub wheel 6. Accordingly, adherence of metallic particles to the magnetic encoder 10 can be further avoided more effectively. It is to be noted that the wheel support bearing assembly B with which the protective cap 18A can be utilized may be of a structure shown in and described with reference to FIGS. 1 to 3.

Figure 6:
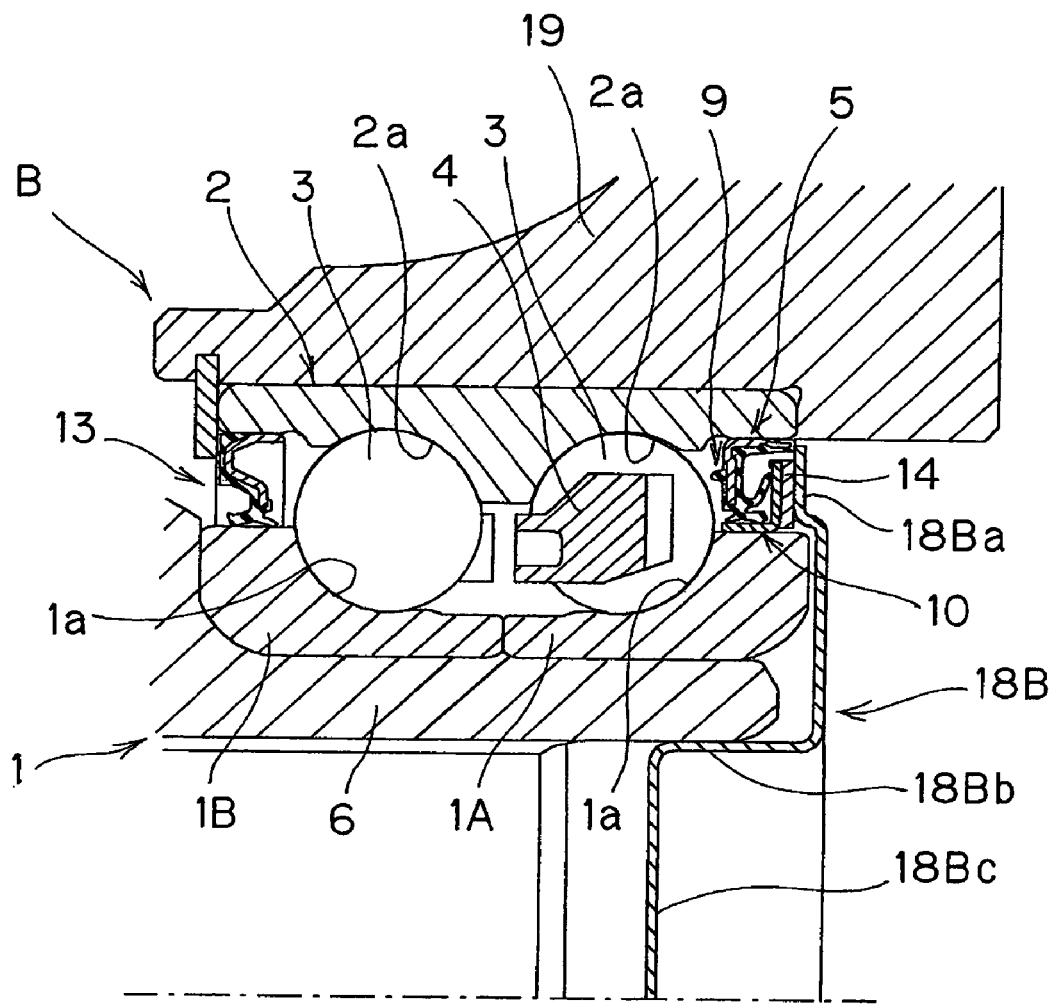
FIG. 6 is a fragmentary longitudinal sectional view, showing on an enlarged scale the manner in which the protective cap is mounted on the wheel support bearing assembly according to a third preferred embodiment of the present invention.

The protective cap according to a third preferred embodiment of the present invention is shown in FIG. 6. The protective cap identified by 18B is similar to the protective cap 18 shown and described in connection with the first embodiment of the present invention. However, the protective cap 18B is of a design in which a cylindrical engagement wall 18Bb can be removably engaged with one end of an inner diameter of the hub wheel 6 on which the inner race segments 1A and 1B forming respective parts of the inner member 1 of the wheel support bearing assembly B are coaxially mounted.

Other structural features of the protective cap 18B are substantially similar to those of the protective cap 18 shown in and described in connection with the first embodiment of the present invention with reference to FIGS. 1 to 3. Specifically, an outer peripheral annular cover-up portion 18Ba, similar in shape and function to the annular cover-up portion 18b shown in FIGS. 1 to 3, is used to enclose the multi-pole magnet 14 of the magnetic encoder 10 and the inboard radial face of the inner race 1A; and a center cover-up portion 18Bc, similar in shape and function to the center cover-up portion 18c shown in FIGS. 1 to 3, is continued from the cylindrical engagement wall 18Bb as described above.

According to the third embodiment of the present invention, the protective cap 18B can be mounted on the wheel support bearing assembly B after the latter has been coupled with the knuckle 19 and the hub wheel 6. Accordingly, the protective cap 18B is effective to protect an assembly, including the wheel support bearing assembly B, the hub wheel 9 and the knuckle 19, from being contaminated and/or deposited with metallic particles during the transportation of such assembly.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, in describing each of the foregoing embodiments of the present invention, the wheel support bearing assembly B with which the protective cap of the present invention is removably used has been described in which the inner member 1 is constructed of the hub wheel 6 and the inner race segments 1A and 1B coaxially mounted on such hub wheel 6. However, the wheel support bearing assembly that can utilize the protective cap of the present invention may be of a so-called third generation type in which the inner member 1 is constructed of the hub wheel 6 and only one inner race segment 1A with the raceway grooves 1a defined respectively in the hub wheel 6 and the inner race segment 1A.

Also, in any one of the foregoing first and third embodiments, not only can the use of the center cover-up portion 18c or 18Bc be dispensed with, but also the cylindrical engagement wall 18b or 18Bb may be comprised of a plurality of circumferential tubs or projections (not shown) bent to protrude from respective portions of the annular cover-up portion 18a or 18Ba in a direction axially inwardly of the wheel support bearing assembly.

Although this is quite different from the present invention, as a member for enclosing the multi-pole magnet 14 of the magnetic encoder 10, an annular sealing sheet may be applied to an annular bare surface of the multi-pole magnet 14 in place of the protective cap 18, 18A or 18B.

Accordingly, such changes and modifications are, unless they depart from the scope of the present invention as delivered from the claims annexed hereto, to be construed as included therein.

What is claimed is:

1. A wheel support bearing assembly, comprising:
an outer member having an inner peripheral surface formed with raceways;

an inner member having an outer peripheral surface formed with raceways in alignment with the raceways in the outer member;

rows of rolling elements operatively interposed between the raceways in the outer member and the raceways in the inner member;

sealing units for sealing respective open ends of an annular working space delimited between the inner and outer members;

a magnetic encoder provided in one of the sealing units and having an annular surface exposed bare to a radial face of the wheel support bearing assembly, the magnetic encoder having a plurality of alternating magnetic poles arranged in a direction circumferentially thereof; and a protective cap comprising an annular cover-up portion for enclosing the annular surface of the magnetic encoder that is exposed bare to the radial surface of the wheel support bearing assembly, and an engagement wall integral with the annular cover-up portion and capable of being removably engaged with an inner peripheral surface of one end of an axial bore of the inner member, whereby the protective cap is removably mounted on the wheel support bearing assembly.

2. The wheel support bearing assembly as claimed in claim 1, wherein the engagement wall is of a cylindrical shape.

3. The wheel support bearing assembly as claimed in claim 1, wherein the protective cap further comprises a center cover-up portion for covering a center portion of an end face of the wheel support bearing assembly.

4. The wheel support bearing assembly as claimed in claim 1, wherein the protective cap is of a ring shape and wherein the engagement wall is removably inserted in a gap delimited between an outer periphery of the encoder and the sealing unit.

5. The wheel support bearing assembly as claimed in claim 1, wherein the inner member of the wheel support bearing assembly includes an inner race and a hub wheel engageable with an inner peripheral surface of the inner race, and wherein the engagement wall is removably engageable with one end of an inner peripheral surface of the hub wheel.

6. A wheel support bearing assembly comprising:

inner and outer members with sealing units sealing respective open ends of an annular working space delimited therebetween;

rows of rolling members operatively interposed in between the inner and outer members;

a magnetic encoder provided in one of the sealing units and having an annular surface exposed bare to a radial face of the wheel support bearing assembly; and a protective cap comprising an annular cover-up portion enclosing the exposed annular surface of the magnetic encoder and an engagement wall, integral with the annular cover-up portion, and removably engaged with an inner peripheral surface of one end of an axial bore of the inner member.

7. A wheel support bearing assembly comprising:

rotatable and fixed members, each having a pair of sealing units that collectively seal respective open ends of an annular working space delimited therebetween;

rows of rolling members operatively interposed between the rotatable and fixed members;

a magnetic encoder provided in one of the sealing units of the rotatable member and having an annular surface exposed bare to a radial face of the wheel support bearing assembly; and a protective cap comprising an annular cover-up portion, enclosing the exposed annular surface of the magnetic encoder, and having a distal end thereof contacting an axially outward end of an elastic sealing element of one of the fixed member sealing units and an engagement wall, integral with the annular cover-up portion, and removably engaged with the rotatable member, whereby the protective cap is removably mounted on the wheel support bearing assembly.

* * * * *